United States Patent [19]

Hitchcock et al.

[11] Patent Number: 4,979,363
[45] Date of Patent: Dec. 25, 1990

[54] DIVERTER VALVE WITH BYPASS DUCT OBTURATOR

[75] Inventors: Malcom C. Hitchcock; Clifford S. Woodward, both of Bristol; William J. Lewis, Winscombe, all of England

[73] Assignee: Rolls-Royce plc, London, England

[21] Appl. No.: 820,249

[22] Filed: Nov. 15, 1985

[30] Foreign Application Priority Data

Nov. 17, 1984 [GB] United Kingdom ............... 8429106
Sep. 4, 1985 [GB] United Kingdom ............... 8521954

[51] Int. Cl.⁵ ............................................. F02K 3/02
[52] U.S. Cl. ................................. 60/226.3; 244/12.5
[58] Field of Search ............... 244/12.5, 56; 60/226.1, 60/226.3, 233

[56] References Cited

U.S. PATENT DOCUMENTS

| | | | |
|---|---|---|---|
| 3,913,321 | 10/1975 | Snell | 60/226.3 |
| 3,972,490 | 8/1976 | Zimmermann et al. | 244/12.5 |
| 4,038,818 | 8/1977 | Snell | 60/226.3 |
| 4,171,112 | 10/1979 | Harvey | 244/12.5 |
| 4,248,041 | 2/1981 | Wilde et al. | 244/12.5 |
| 4,343,446 | 8/1982 | Langley | 244/12.5 |
| 4,587,803 | 5/1986 | Nightingale et al. | 244/12.5 |

FOREIGN PATENT DOCUMENTS

963406 7/1964 United Kingdom.
1252077 11/1971 United Kingdom.

Primary Examiner—Charles T. Jordan
Assistant Examiner—Rochelle Lieberman
Attorney, Agent, or Firm—Oliff & Berridge

[57] ABSTRACT

A fluid flow diverter system for use with twin engine vertical take-off aircraft. The diverter sysstem is employed to direct a portion of, or all, the working fluid from the first axial flow compressor (14) of either a by-pass engine, a twin fan engine or a variable cycle engine to either a pair of vectorable front nozzles (36) or to a by-pass duct (34). In the event of one engine failing in flight, an attempt at balancing the remaining thrust for vertical landing is made by ducting all the air normally existing from the operative engine's front nozzle (36) across to the inoperative engine's front nozzle (36).

7 Claims, 6 Drawing Sheets

DIVERTER VALVE WITH BYPASS DUCT OBTURATOR

This invention relates to twin engine installations for aircraft with vertical take off and landing (VTOL) capability.

The well known British Aerospace PLC Harrier aircraft is powered by a single Rolls-Royce Limited Pegasus engine which employs vectorable hot and cold propulsive thrust nozzles. When landing or taking off vertically the nozzles are pointed downwards to provide upwards thrust and for horizontal forward flight the nozzles are directed rearwards.

There are also engines generally known as variable cycle engines (such as described in U.S. Pat. 3,913,321 and 4,038,818). In general, these engines comprise a first axial flow compressor and a core engine comprising, in flow series, a second compressor, combustion equipment, and turbines to drive the compressors. The engine is capable of operating in two distinct modes. These modes are namely a "series flow" mode and a "parallel flow" mode. In the series flow mode the first and second compressors are connected in flow series and the whole of the output flow of the first compressor supercharges the second compressor. In the parallel flow mode the output flow of the first compressor is prevented from supercharging the second compressor and is discharged to ambient air through fixed or vectorable nozzles, and simultaneously an auxiliary air intake is opened up to allow air to enter the second compressor.

It is well known that aircraft with twin engine installations offer many advantages in terms of performance and reliability and also offer the opportunity of improved safety margin in the unlikely event that one engine fails. There have been many proposals in the past for twin engine powered VTOL aircraft. A common problem encountered with such earlier proposals is that if one engine fails during vertical flight the asymmetric upward thrust produced by the engine which has not failed can cause the aircraft to roll about its longitudinal axis.

One solution to this problem has been to locate the nozzles close to the center-line of the aircraft as described in U.S. 4,343,446. However, in some aircraft designs it is not possible or desirable to locate the nozzles on the aircraft center-line.

An object of the present invention is to provide a twin engine layout for an aircraft which enables the aircraft to assume a stable attitude when flying vertically in the event of one of the engines failing.

The present invention as claimed herein enables the output flow of the engine which has not failed to be discharged through the outlet nozzle of the failed engine without allowing the air flow to leak through the compressors or turbines of the failed engine.

Aspects of the present invention will now be described by way of example only with reference to the accompanying drawings, in which.

Figure 1:
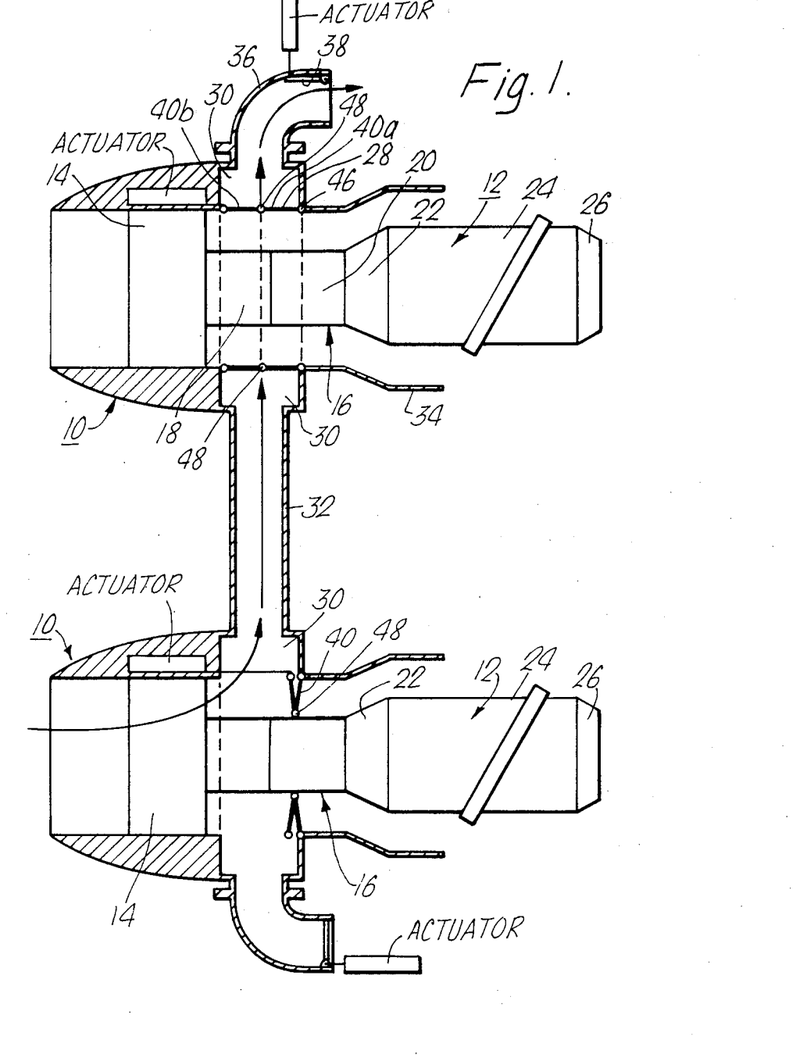
FIG. 1 is a cross-sectional view of a twin engine installation showing an arrangement of blocker doors as used with a by-pass engine installation.

Referring to FIG. 1 a generally round nacelle (10) houses a gas turbine engine (12) comprising a first axial flow compressor (14) and a core engine (16) comprising, in flow series, a second axial flow compressor (18), combustion means (20), turbine means (22), a jet pipe (24), and a vectorable rear nozzle (26), as well as a blocker door assembly (28), an annular exhaust duct (30), a cross-linking duct (32), a by-pass duct (34), vectorable front nozzle means (36), and front nozzle obturation means (38).

The blocker door assembly (28) comprises a plurality of pairs of blocker doors (40) circumferentially spaced around the engine center-line. Each door assembly comprises two doors (40a) and (40b). One end of the first door (40a) is pivoted at point (46) on the annular exhaust duct wall, and its other end is linked in an articulated fashion to one end of the second door (40b) at point (48). The other end of the second door is located in, but axially movable along a guide (not shown) which is fixed to the annular exhaust duct wall (30). The blocker doors (40), in their first position, lie flush with the inside wall of the annular exhaust duct (30) and obturate the one or more openings into the duct (30). In their second position the blocker doors (40) are deployed into the flow of the by-pass air such that they obturate the one or more openings at the rear of the by-pass duct (34) and undercover the one or more openings in the sidewall of the annular exhaust duct (30).

The front nozzle obturator means (38), shown schematically, and well understood per se, are provided to obturate the front nozzles (36). In their first position the obturator means (38) lie flush with the inside wall of the front nozzle (36) in order to allow exhaust gas from the annular exhaust duct (30) to vent to atmosphere. The obturator means are assumed to be in their first position unless stated as being in their second position, where they are deployed into the flow of air and obturate the vectorable front nozzles (36).

Actuator means, shown schematically and well understood per se, are provided to move the blocker doors (40) and front nozzle obturation means (38) from their first positions to their second positions.

Three modes of operation are possible. In the first mode both engines operate in the by-pass mode, in which the by-pass air from the first axial flow compressor (14) is vented to atmosphere via the by-pass duct (34). This is achieved by moving the blocker doors (40) to obturate the one or more openings into the annular exhaust duct (30) and the one or more openings into the by-pass duct (34).

In the second mode of operation the by-pass air from the first axial flow compressor is vented to atmosphere via the front vectorable nozzles (36). This is achieved by moving the blocker doors (40) to obturate the one or more openings in the by-pass duct (34) and uncover the one or more openings in the annular exhaust duct (30), air from the first axial flow compressor (14) being directed into the annular exhaust duct (30) by the blocker doors (40) and then vented to atmosphere via the front vectorable nozzles (36).

In the third mode of operation, used if one engine fails in flight and balanced thrust is required, air from the operative engine's first axial flow compressor (14) is ducted to the inoperative engine's front vectorable nozzle (36). This is achieved by moving the blocker doors (40) to obturate the one or more openings in the by-pass duct (34) and obturating the front vectorable nozzles (36) on the operative engine. By-pass air from the operative engine's first axial flow compressor (14) may then be directed into its annular exhaust duct (30) and across to the inoperative engine via the cross-linking duct (32). The air enters the inoperative engine's annular exhaust duct (30) and is vented to atmosphere via the inoperative engine's front vectorable nozzle means (36). The air is prevented from entering the inoperative engine by moving the blocker doors (40) to obturate the one or more openings into the annular exhaust duct (30).

Figure 2:
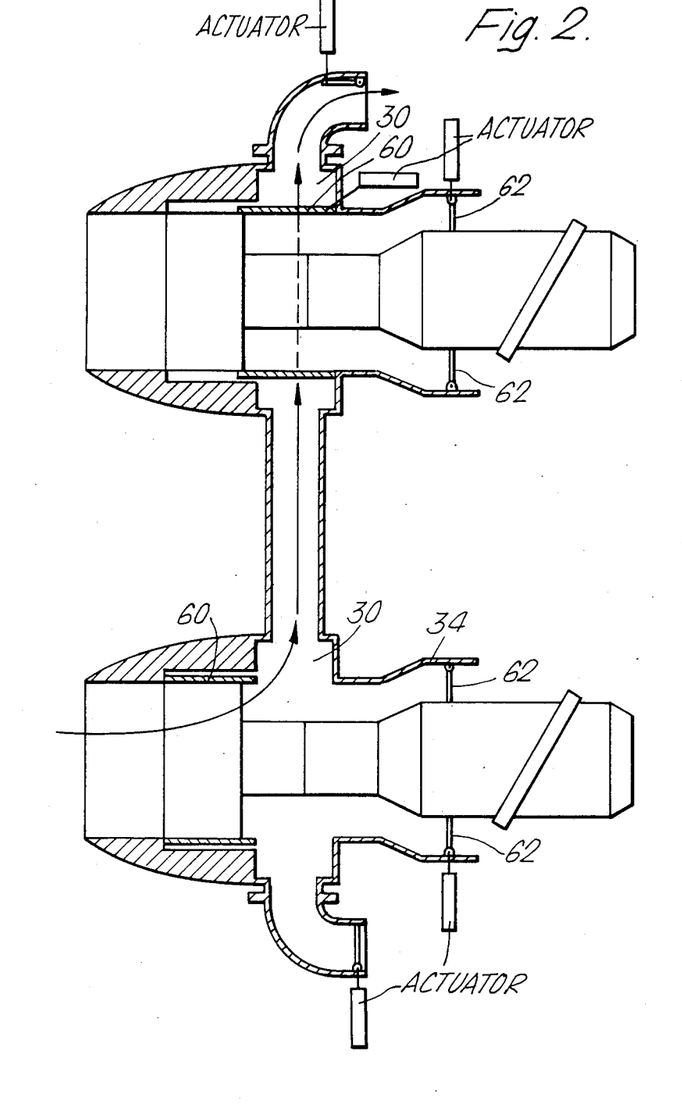
FIG. 2 is a cross-sectional view of a twin engine installation showing an arrangement of blocker doors and slide valve as used, with a by-pass engine installation.

FIG. 2 illustrates a further embodiment in which the blocker door assembly as described above has been replaced by an axially displaceable slide valve (60) at the annular exhaust duct orifices (30) and a plurality of blocker doors (62) in the by-pass duct (34). The blocker doors (62) are spaced circumferentially spaced around the engine center-line in the by-pass duct (34), with one end of their ends being pivoted at a point on the duct wall (34). In their first position they lie flush with the side wall of the duct (34) and in their second position they are displaced such that each door cooperates with its neighbouring door to obturate the by-pass duct (34).

In the first position of both the slide valve (60) and the blocker doors (62) a flow path is provided for air to pass from the first axial flow compressor (14) to the by-pass duct (34). In the second position of the slide valve (60) and the blocker doors (62) a flow path is provided to vent air to atmosphere from the front vectorable nozzles (36) via the annular exhaust duct (30).

In the event of one engine failing in flight, an attempt to balance the thrust would be made by ducting by-pass air from the operative engine's first axial flow compressor (14) to the inoperative engine's front vectorable nozzle (36) via the cross-linking duct (32) and the inoperative engine's annular exhaust duct (30). This is achieved by moving the slide valve (60), the blocker doors (62) and the nozzle obturator means (38) to their second positions on the operative engine, and by moving slide valve (60) to its first position on the inoperative engine.

Actuator means, shown schematically and well understood per se, are provided to move the slide valve (60), the blocker doors (62) and the nozzle obturator means (38) from their first positions to their second positions.

Figure 3:
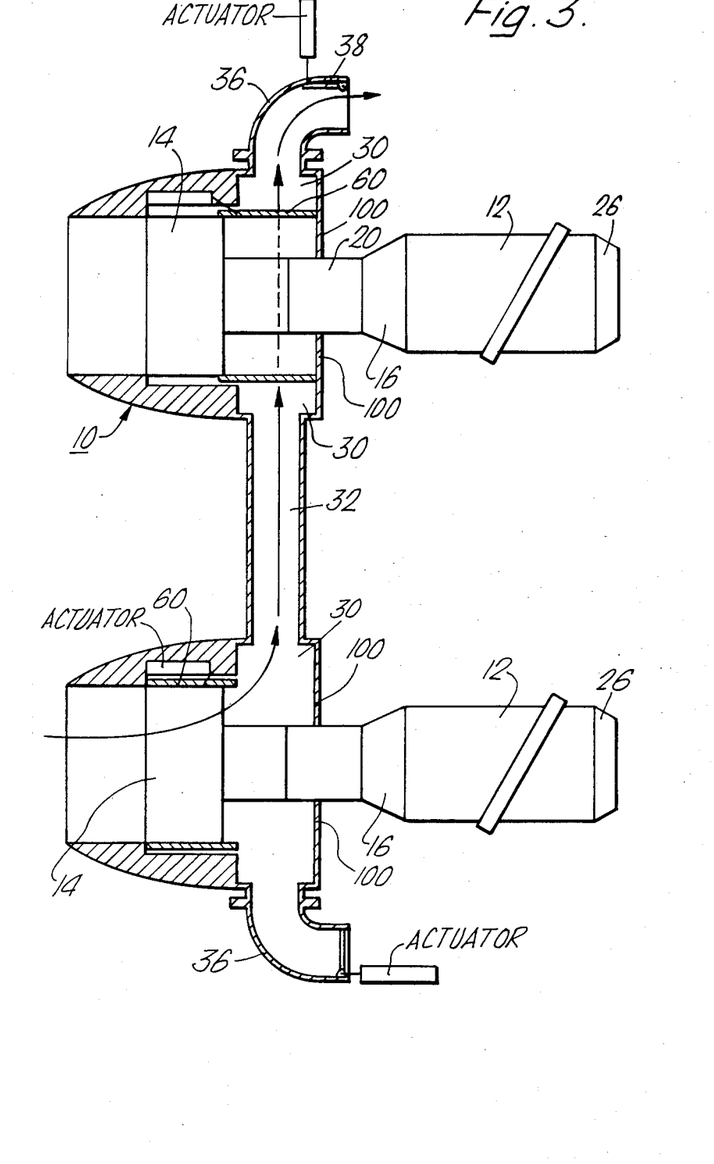
FIG. 3 is a cross-sectional view of an alternative twin engine installation in which two engines of the Rolls-Royce Pegasus type are used and the by-pass duct and blocker doors are dispensed with for simplicity.

In FIG. 3, the present invention is shown adapted to receive two Rolls-Royce Pegasus type engines of conventional form. The adaptation includes blocking off the by-pass duct (34) just aft of the front nozzles (36) in the region shown at (100) and removing the rearward portion of the duct (34) together with its associated blocker doors (62).

In the first two modes of operation normally available, the slide valves (60) are opened which allows air from the first axial flow compressor (14) to enter the annular exhaust duct (30) and vent to atmosphere via the front vectorable nozzles (36). In the first of these two modes of operation the nozzles (36) are directed rearwardly and the exhaust gasses act to propel the aircraft forwards. In the second or hover mode, the nozzles (36) are directed vertically downwards and the thrust acts to support the weight of the aircraft.

In the event of one engine failing in flight, an attempt to balance the thrust would be made by ducting air from the operative engine's first axial flow compressor (14) to the inoperative engine's front vectorable nozzle (36). The air enters the inoperative engine's annular exhaust duct (30) via the cross-linking duct (32) and is vented to atmosphere via the inoperative engine's front vectorable nozzle (36). The air is prevented from entering the inoperative engine by moving the slide valve (60) on the inoperative engine to obturate the one or more openings in the annular exhaust duct (30) and is prevented from exiting the operative engine's front nozzles (36) by actuating the associated blocker door (38).

Actuator means, shown schematically and well understood per se, are provided to move slide valve (60) and the front nozzle obturator means (38).

Figure 4:
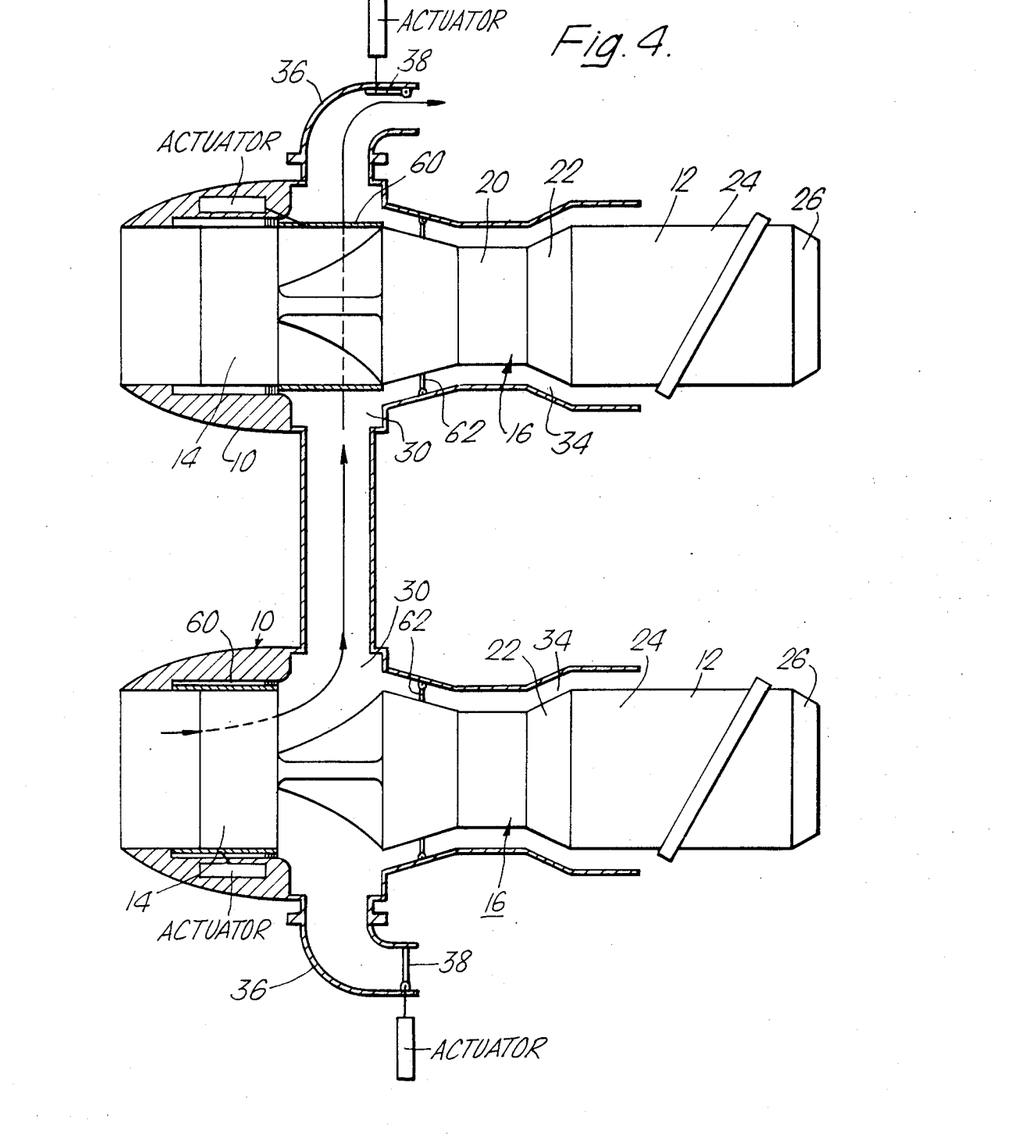
FIG. 4 is a cross-sectional view of a twin engine installation showing a typical installation of the invention as used, with a twin fan engine.
Figure 5:
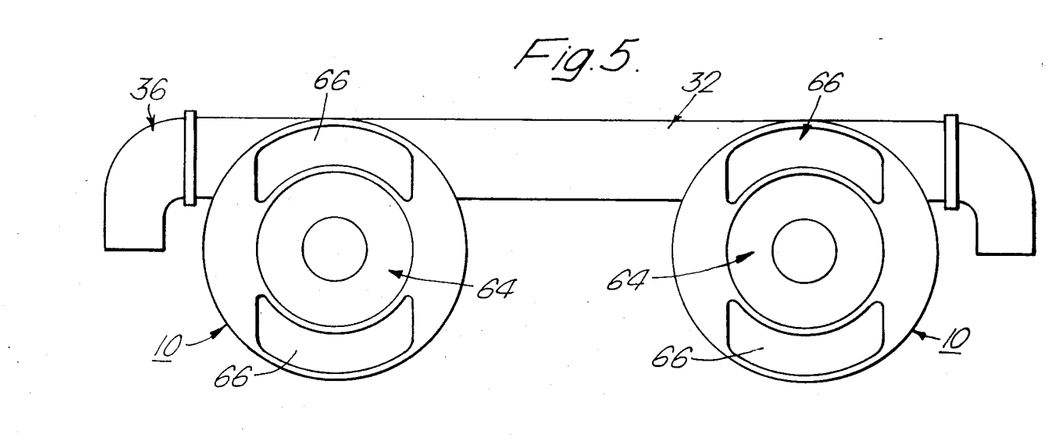
FIG. 5 is a typical front view of a twin engine installation, as used with a twin fan engine of FIG. 4 or variable cycle engine of FIG. 6, illustrating the auxiliary intakes for the second compressor.

FIGS. 4 and 5 illustrate a further embodiment, in which an axially displaceable slide valve (60) and a plurality of blocker doors (62), both substantially as described above, are used in conjunction with a twin fan engine installation, which an auxiliary air intake (66) is provided for the core engine (16).

In the first of two modes of operation normally available, the slide valves (60) are opened and the blocker doors (62) in the by-pass duct closed. This allows air from the first axial flow compressor (14) to enter the annular exhaust duct (30) and vent to atmosphere via the front vectorable nozzles (36).

In the second mode of operation, the slide valves (60) and the blocker doors (62) in the by-pass duct (34) are opened and the front nozzle obturator means (38) are closed. This allows air from the first axial flow compressor to vent to atmosphere via by-pass duct (34).

In the event of one engine failing in flight, an attempt to balance the thrust would be made by ducting front fan air from the operative engine to the inoperative engine's front vectorable nozzles (36) whilst the operative engine's core engine (16) vents to atmosphere via its normal vectorable rear nozzle (26).

This is achieved by closing both the nozzle obturation means (38) and the blocker doors (62) in the by-pass duct (34), and opening the slide valve (60) on the operative engine whilst simultaneously closing both the slide valve (60) and the blocker doors (62) in the by-pass duct (34) of the inoperative engine.

Figure 6:
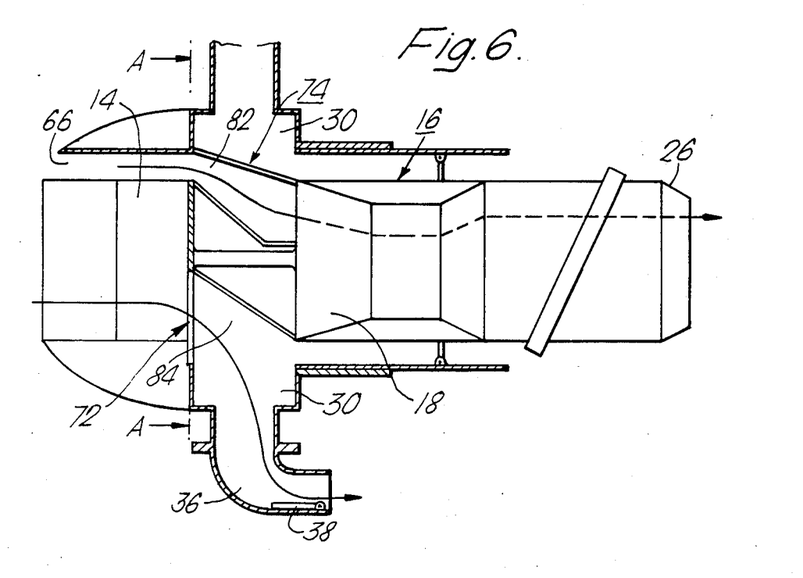
FIG. 6 is a cross-sectional view of a variable cycle engine illustrating a typical installation of the invention.

In FIG. 6 there is shown yet a further embodiment of the invention, in which a circular blocker plate (72) and a cross over valve (74) are positioned between the first axial flow compressor (14) and the core engine (16).

The blocker plate (72) has a plurality of first slots (78) circumferentially spaced around an outer diameter D, which communicate with auxiliary air intakes (66), and a plurality of second slots (80) circumferentially spaced around an inner diameter d, between the first slots (78), which communicate with the first axial flow compressor (14).

The cross over valve (74) consists of a plurality of ducts (82,84,86). The ducts (82) are spaced around the outer circumference of the valve (74) at its upstream end and extend both axially rearward and radially inward such that they are spaced around the inside diameter of the valve (74) at its downstream end, in order to communicate with the second axial flow compressor (18). The ducts (84) are spaced around the inner circumference of the valve (74) at its upstream end and extend both axially rearward and radially outward such that they communicate with the annular exhaust duct (30) at their downstream end. The ducts (86) lie at the same radius as, and are spaced between, the ducts (84) at the upstream end of the cross over valve (74) and extend axially rearward such that they communicate with the second axial flow compressor (18) at their downstream end.

In a first position of the valve (74) (FIG. 7) the engine operates in a by-pass mode in which the ducts (82) communicate with the first slots (78) in the blocker plate (72) and the ducts (84) communicate with the second slots (80) in the blocker plate (72). This allows air to be delivered to the second axial flow compressor (18) from the auxiliary air intakes (66) and to the annular exhaust chamber (30) from the first axial flow compressor (14).

Figure 7:
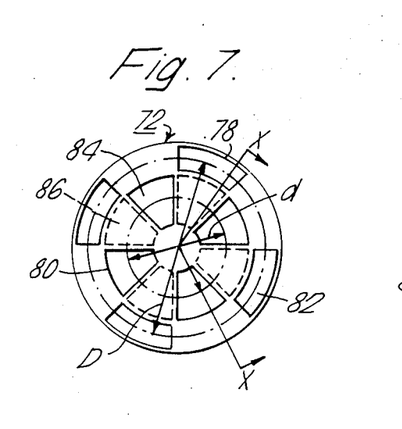
FIGS. 7 and 8 are views in the direction of Arrows A—A in FIG. 6.

Under normal operating conditions air may be vented to atmosphere from the annular exhaust duct chamber (30) via the front vectorable nozzles (36). This is achieved by moving the slide valve (60) to uncover the one or more openings into the annular exhaust duct chamber (30) and closing the blocker doors (62) in the by-pass duct (34). Alternatively, air may be vented to atmosphere from the annular exhaust duct via the by-pass duct (34). This is achieved by moving the slide valve (60) to cover the one or more openings into the annular exhaust duct chamber (30) and opening the blocker doors (62) in the by-pass duct (34).

Figure 8:
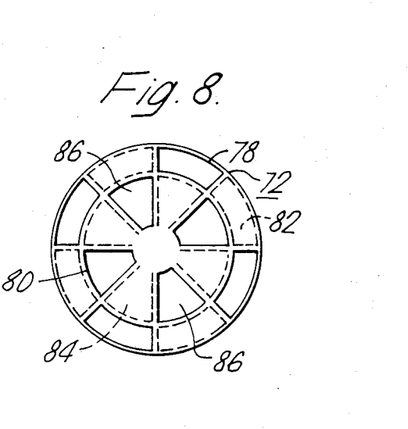
Figure 9:
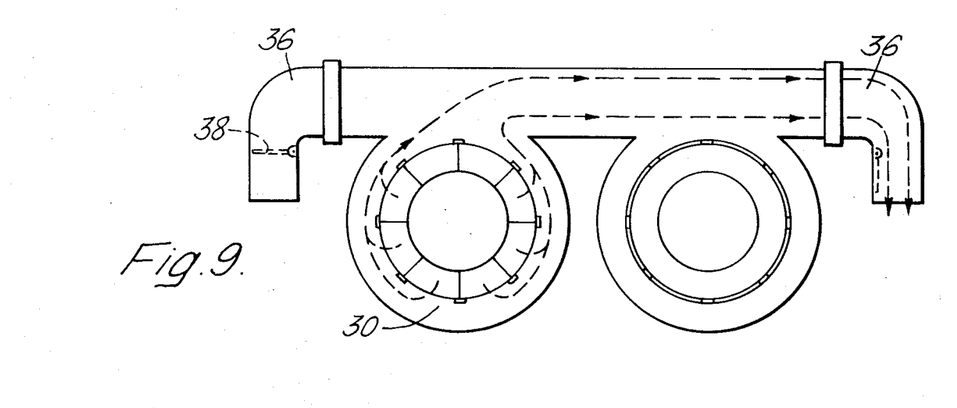
FIG. 9 is a cross-sectional view of the engines of FIGS. 1 to 6 showing the annular exhaust ducts and cross-linking duct.

In a second position of the valve (74) (FIG. 8) the engine operates in a series flow mode in which the ducts (82 and 84) are obturated by the blocker plate (72) and the ducts (86) communicate with the second slots (80) in the blocker plate. This allows air from the first axial flow compressor (14) to enter the core engine (16) and thus supercharge the core engine (16).

In the event of one engine failing in flight, an attempt to balance the thrust would again be made by ducting air from the first axial flow compressor (14) of the operative engine to the engines inoperative engine's front vectorable nozzles (36) whilst the operative core engine (16) vents to atmosphere via its normal vectorable rear nozzle (26). This is achieved by running the operative engine in the by-pass mode, obturating its by-pass duct (34) and its front vectorable nozzles (36) and moving the slide valve (60) on the inoperative engine to obturate the one or more openings in its annular exhaust duct (30).

Actuator means, shown schematically and well understood per se, are provided to move both the slide valve (60) and the blocker doors (62) in the by-pass duct (34) from their one position to another.

We claim:
1. A fluid flow diverter system comprising:
 (a) two or more gas turbine engines each of which includes:
  a first compressor;
  a second compressor, connected to receive air from the first compressor;
  combustion means, connected to receive air from the second compressor;
  turbine means, connected to the compressors to drive the compressors;
  a jet pipe downstream of the turbines, connected to receive air from the turbines;
  a rear exhaust nozzle, at the downstream end of the jet pipe;
  a by-pass duct positioned to receive at least part of the air from the first compressor;
  an outlet exhaust duct;
  a first outlet opening in the by-pass duct which interconnects the by-pass duct with the exhaust duct;
  a first outlet opening in the exhaust duct;
  an exhaust duct outlet nozzle, connected for flow to the first outlet opening of the exhaust duct
  obturator means for selectively covering and uncovering the first outlet opening in the by-pass duct; and
  a second outlet opening int he exhaust duct; and
 (b) a cross-linking duct, positioned to communicate with the second outlet openings in the exhaust ducts of said two or more gas turbine engines.

2. A fluid flow diverter system as claimed in claim 1 in which the by-pass duct is further provided with a second outlet opening.

3. A diverter system as claimed in claim 2, in which the obturator means comprises a plurality of pairs of blocker doors circumferentially spaced around each by-pass duct, each pair of doors comprising a first and a second door, one end of the first door being pivotably connected to the exhaust duct wall and its other end being hinged to one end of the second door the otherwise free end of the second door being located in, but axially movable along, a guide, said first and second doors being movable between a first position in which the doors obturate the first outlet openings of the by-pass ducts and uncover the second outlet openings of the by-pass ducts, and a second position in which the doors uncover the first outlet openings of the by-pass ducts and cover the second outlet openings in the by-pass ducts.

4. A diverter system according to claim 2, in which the obturator means comprises an axially displaceable slide valve adjacent the first outlet opening in each by pass duct, said valves being movable between a first position in which the valves uncover the first outlet openings in the by-pass ducts and a second position in which the valves obturate the first outlet openings in the by pass ducts the diverter system further including a plurality of blocker doors situated in each by-pass duct which in a first position obturate the second outlet openings of the by-pass ducts and in a second position uncover the second outlet openings of the by-pass ducts.

5. A diverter system according to claim 1, in which the obturator means comprises an axially displaceable slide valve adjacent he first outlet opening in each by-pass duct, the valves being movable between a first position in which the valves uncover the first outlet opening in the by-pass ducts and a second position in which the valves obturate the first outlet openings in the by-pass ducts.

6. A diverter system as claimed in claim 1, in which each exhaust duct outlet nozzle is provided with a nozzle obturator flap and means for moving said flap from a first position where it uncovers the outlet of the nozzle to a second position where it obturates the outlet of the nozzle.

7. A method of diverting a fluid flow in a diverter system from a first axial flow compressor of a first operable gas turbine engine through a cross-linking duct to an exhaust duct outlet nozzle of a second inoperable gas turbine engine, the method comprising the steps of:

obturating second outlet openings in a by-pass duct of the operable engine, and uncovering one or more first outlet openings in a by-pass duct of the operable engine;

obturating one or more first outlet openings in a by-pass duct of the inoperable engine, and uncovering second outlet openings in a by-pass duct of the inoperable engine;

obturating an outlet of an exhaust duct outlet nozzle of the operable engines; and uncovering an outlet of an exhaust duct outlet nozzle of the inoperable engine.

* * * * *